Aug. 7, 1934.  P. J. McINTYRE  1,969,142
TUBE COUPLING
Filed Feb. 6, 1931
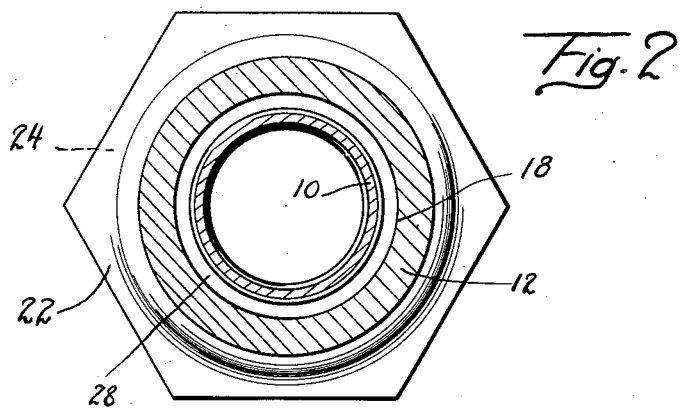
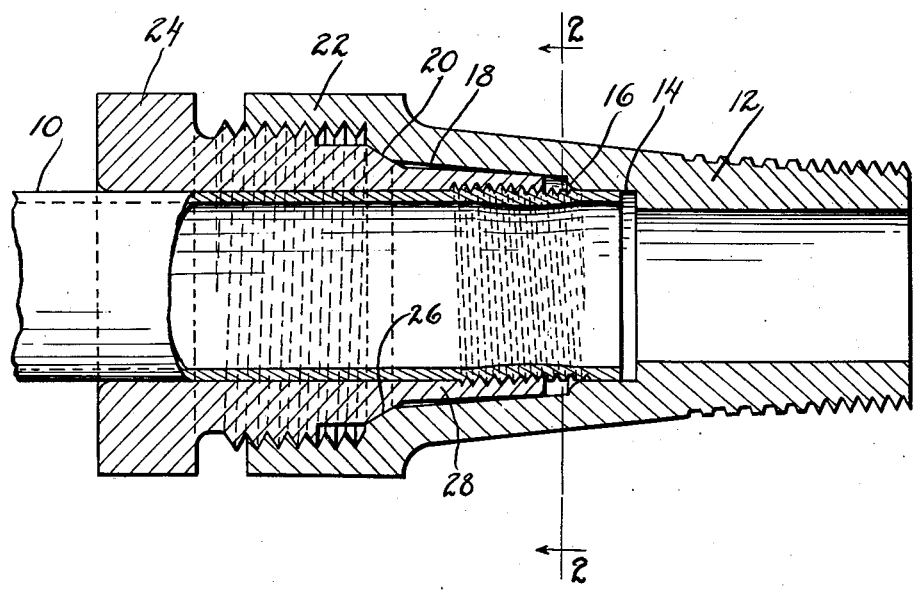
INVENTOR.
Patrick J. McIntyre
BY
ATTORNEYS Patented Aug. 7, 1934

1,969,142

UNITED STATES PATENT OFFICE 1,969,142

TUBE COUPLING

Patrick J. McIntyre, Detroit, Mich.

Application February 6, 1931, Serial No. 513,978

3 Claims. (Cl. 285—166)

My invention relates to couplings for tubular elements and has particular reference to pipe fittings, et cetera.

Hitherto in coupling unthreaded tubes or pipes to one another or to some other type of fitting, such as an elbow joint or valve intake or exhaust, it has been necessary to go through a rather complicated procedure. Skilled workmanship was required in the performance of the operation and it was necessary to flare the end of one of the elements and subsequently to form a sleeve about the other which could be threaded to receive a nut to firmly unite the two ends.

I propose to eliminate the necessity for such procedure by providing a standard type of coupling assembly, the parts for which may be made in various sizes and of varying inside diameter to be utilized with all standard types of tube and pipe fittings.

Such broad provisions for forming a coupling of the type described have been developed hitherto, but I have devised an improved assembly which results in a tighter joint which is sealed at a plurality of points against leakage of the fluid passing through the coupling and which is more readily assembled than any hitherto available.

A further object of my invention is to provide means whereby the manipulation of a single control element of the assembly results in first forming a tight threaded seal between the said element and the initially unthreaded tube, and subsequently, by means of the thread so formed, forces the said tube axially to form a tight driving fit within a specially formed fitting. Simultaneously with this last operation a leak proof fluid seal is formed between the fitting and the control element which, alone, need be manipulated to secure the results aforesaid.

Various other objects and meritorious features of my invention will be apparent from the following description taken in conjunction with the drawing wherein like numerals refer to like parts throughout the several figures and wherein:

Fig. 1 is a section through my improved coupling, and

Fig. 2 is a section through 2—2 of Fig. 1.

Referring now to the drawing, the numeral 10 represents a tube or pipe which is originally unthreaded and which is to be coupled with another conduit or fitting. The fitting 12 may be of standard size adapted to fit various standard conduits and joints.

As illustrated this fitting is of a generally flared contour around its exterior and is provided with a cylindrical seat 14 of slightly less diameter than that of the pipe 10 with which it is to be coupled. The walls of this cylindrical seat are flared outwardly as at 16 into a rounded cam like formation and the interior side walls then diverge outwardly to form a primary cam surface 18. A secondary and a more sharply inclined cam surface 20 is provided at the outer extremity of the primary cam surface and the interior of the cylindrical walls 22 at the extremity of the fitting 12 are provided with a right hand thread.

In performing the coupling operation a sleeve nut 24 is first slipped over the end of tube 10. This nut is provided with an exterior thread adapted to cooperate with the interior thread in wall 22 to force the nut into the fittings 12, as clearly indicated in Fig. 1. At the inner extremity of the threaded portion of nut 24 there is a conical tapered surface 26 adapted to abut the surface 20 of element 12 to form a stop for relative movement between the two. Extending away from the base of inclined surface 26 there is a cylindrical sleeve portion 28 which is internally threaded, as indicated in the drawing, with a left hand thread. The inner bore of sleeve nut 24 is cylindrical and adapted to slide freely over the tube 10.

The end of tube 10, after having the sleeve nut 24 slipped thereover, is thrust into the threaded opening of fitting 12 until its ends abut the rounded cam like surface 16 of the latter. The hex nut is then slipped up to a position where it may be threaded into the walls 22 of fitting 12 and screwed therein. As the sleeve nut is screwed in, the outer walls of sleeve portion 28 will be forced radially inwardly a very slight amount by engagement with the tapered cam surface 18. This radial movement will be extremely slight but on continued rotation of sleeve nut 24 it will be sufficient to cause the internal left hand threads on the inside of sleeve 28 to bite in to the exterior surface of tube 10 and gradually spin a corresponding thread therein. The result will be that, on further continued rotation of nut 24 the left hand thread will force the tube 10 axially toward the cylindrical seat 14, the initial entrance into which has been made possible by the initial radial restriction of the tube caused by the tapered cam surface 18 bearing upon the exterior of sleeve 28. This creates a very tight joint between the extremity of the tube and the cylindrical seat 14 and may be utilized as a driving engagement if so desired. It should be noted that there is no necessity for the end of tube 10 striking the shoulder of cylindrical seat 14 in order to secure a satisfactory seal. By reason of the fact that the extremity of tube 10 has been constricted through the pressure exerted by the threaded end of sleeve member 28 sufficiently to ride up over the curved shoulder 16 and extend into the cylindrical seat 14, a tight seal is automatically secured. If it should become necessary after a period of time to tighten up the coupling somewhat, a most effective tightening action is secured by simply rotating the sleeve 28, thereby forcing the tube 10 still further into the cylindrical seat 14 until it ultimately abuts against the shoulder thereof.

The pitch of the various threads, the depth of cylindrical seat 14, and the length of tapered cam surface 18 are all so proportioned that the surfaces 20 and 26 of the coupling element and sleeve nut respectively will form a stop against further manipulation of nut 24 shortly after the extreme end of tube 10 has been forced into driving engagement with cylindrical seat 14. This constitutes a second fluid seal, the third, which is perhaps the most effective of all, being formed between the exterior of sleeve 28 and the interior cam surface 18 against which it is forced.

Should the coupling assembly become loose at any time, or leakage be caused by extreme pressure within, it is only necessary to tighten the sleeve nut 24 to recreate the triple seal hitherto described. It will be noted that the operation is extremely simple, that the parts are inexpensive and easy to manufacture, and that the simplicity of the structure renders it available in a large variety of standard sizes.

While I have not specified any particular type of tube or pipe 10 with which this coupling is adapted for use, it may be utilized with either soft or extremely hard tubing. Where a very hard tubing is to be coupled I contemplate chrome plating the internal threads of sleeve 28 of hex nut 24 for the purpose of providing a very hard surface to spin the necessary thread on the external extremity of the tube. Furthermore, chrome plating has a very high resistance to corrosion and may be readily utilized where corrosion is to be avoided.

It is to be noted that the same effective sealing action may be secured whether the external thread on the tube 10 is spun during the coupling operation or previously thereto. Where the tube utilized has a very thin wall it may not be advisable to spin the thread during the coupling operation. Under such circumstances the thread may be spun, or turned, prior to commencing the coupling operation, so long as the thread so turned is a reversed thread with relation to the exterior thread on the sleeve member 28. The same sealing action by virtue of forcing the tube up into the cylindrical seat 14 will result.

It will be noted that the broad concept of my invention resides in the fact that manipulation of a single element successfully performs three operations, to wit, it first forces the end of the tubing radially inwardly to a slight extent so that a driving fit may be procured between the tube and the coupling element 12, at the same time spinning a thread thereon, and subsequently actuates the said tube to drive it into its seat whereby the driving fit is procured. At the same time it is so formed that upon formation of the driving fit a triple seal will have been formed which renders the coupling substantially leak proof regardless of the pressure or type of fluid within the conduit.

While I have illustrated a particular modification which discloses the basic concept involved, various other structures will be apparent to those skilled in the art and for that reason I intend to limit myself only within the scope of the appended claims.

What I claim:

1. In combination with mechanism of the class described, a sleeve member adapted to provide a sliding fit for an unthreaded pipe, said sleeve being provided with an interior thread of one hand adjacent one extremity thereof, an exterior thread of opposite hand adjacent the opposite extremity thereof, said sleeve being formed to provide an external taper converging toward the internally threaded extremity thereof, said external taper being formed to provide two distinct angles of taper, the taper of less angularity being adjacent the internally threaded extremity of the sleeve.

2. A tube coupling comprising, in combination, a tube, a pair of threadedly engaged telescoping sleeves received over the end of the tube, the outer of said sleeves having an internal cylindrical wall portion of slightly less diameter than the outside diameter of the tube, the inner of said sleeves having a sliding fit with the tube and having an internally threaded portion longitudinally offset with respect to the threaded engagement of said sleeve, said sleeves having cooperating walls operable upon the threading of the inner sleeve into the outer sleeve to constrict the inner sleeve about the tube, spinning a thread thereon and constricting the same and advancing the tube axially with respect to said sleeve into the portion of the outer sleeve of less diameter than the tube to thereby form a seal.

3. A tube coupling comprising, in combination, a tube, a sleeve telescoped thereover and provided with an externally threaded portion and an internally reversely threaded portion longitudinally offset with respect to the externally threaded portion, a cooperating internally threaded tubular fitting threadedly engageable over the externally threaded portion of the sleeve and provided with an internal cylindrical wall portion of slightly less diameter than the external diameter of the tube and also provided with a tapering wall portion positioned between said portion of less diameter and the internally threaded portion of the fitting and having a diameter at its small end less than the external diameter of the sleeve at its internally threaded end, said tapering wall portion operable upon threading of the sleeve into the fitting to engage said sleeve and constrict the same upon the tube, constricting the tube and causing the internal threads of said sleeve to spin a corresponding thread on the tube advancing the tube axially through said sleeve into the cylindrical portion thereof having a less diameter than the tube to thereby form a seal.

PATRICK J. McINTYRE.